(12) United States Patent
Killoran et al.

(10) Patent No.: US 11,562,279 B2
(45) Date of Patent: Jan. 24, 2023

(54) APPARATUS AND METHODS FOR QUANTUM COMPUTING AND MACHINE LEARNING

(71) Applicant: Xanadu Quantum Technologies Inc, Toronto (CA)

(72) Inventors: Nathan Killoran, Toronto (CA); Thomas R. Bromley, Toronto (CA); Juan Miguel Arrazola, Toronto (CA); Maria Schuld, Durban (ZA); Nicolas Quesada, Toronto (CA)

(73) Assignee: Xanadu Quantum Technologies Inc., Toronto (CA)

( * ) Notice: Subject to any disclaimer, the term of this patent is extended or adjusted under 35 U.S.C. 154(b) by 866 days.

(21) Appl. No.: 16/444,624

(22) Filed: Jun. 18, 2019

(65) Prior Publication Data
US 2020/0401920 A1   Dec. 24, 2020

(51) Int. Cl.
*G06N 10/00* (2022.01)
*G06N 3/04* (2006.01)
*G06N 3/067* (2006.01)
*G06N 20/00* (2019.01)

(52) U.S. Cl.
CPC ......... *G06N 10/00* (2019.01); *G06N 3/0445* (2013.01); *G06N 3/067* (2013.01); *G06N 20/00* (2019.01)

(58) Field of Classification Search
CPC ...... G06N 10/00; G06N 20/00; G06N 3/0445; G06N 3/0454; G06N 3/067; G06N 3/084
See application file for complete search history.

(56) References Cited

U.S. PATENT DOCUMENTS

| | | | |
|---|---|---|---|
| 2005/0254823 A1* | 11/2005 | Beausoleil | G06N 10/00 398/140 |
| 2017/0264373 A1* | 9/2017 | Krovi | H04Q 11/0005 |
| 2019/0294199 A1* | 9/2019 | Carolan | G02F 1/225 |
| 2019/0310070 A1* | 10/2019 | Mower | G06N 20/00 |
| 2020/0169396 A1* | 5/2020 | Neven | G06N 3/063 |

OTHER PUBLICATIONS

Arrazola, J. M. et al., "Quantum algorithm for non-homogeneous linear partial differential equations," arXiv preprint arXiv:1809.02622, Sep. 7, 2018, 9 pages.

(Continued)

*Primary Examiner* — Dave Misir
(74) *Attorney, Agent, or Firm* — Cooley LLP

(57) ABSTRACT

An apparatus includes a plurality of processing layers coupled in series. Each processing layer in the plurality of processing layers includes a Gaussian unit configured to perform a linear transformation on an input signal including a plurality of optical modes. The Gaussian unit includes a network of interconnected beamsplitters and phase shifters and a plurality of squeezers operatively coupled to the network of interconnected beamsplitters and phase shifters. Each processing layer also includes a plurality of nonlinear gates operatively coupled to the Gaussian unit and configured to perform a nonlinear transformation on the plurality of optical modes. The apparatus also includes a controller operatively coupled to the plurality of processing layers and configured to control a setting of the plurality of processing layers.

15 Claims, 13 Drawing Sheets

(56) References Cited

OTHER PUBLICATIONS

Biamonte, J. et al., "Quantum machine learning," arXiv preprint arXiv:1611.09347v2, May 10, 2018, 24 pages.
Cao, Y. et al., "Quantum Neuron: an elementary building block for machine learning on quantum computers," arXiv preprint arXiv:1711.11240v1, Nov. 30, 2017, 30 pages.
Clements, W. R. et al., "Optimal design for universal multiport interferometers," Optica, vol. 3, No. 12, pp. 1460-1465, 2016.
Dillon, J. V. et al., "Tensorflow distributions," arXiv preprint arXiv:1711.10604, Nov. 28, 2017, 13 pages.
Ekert, A. & Jozsa, R., "Quantum computation and Shor's factoring algorithm," Reviews of Modern Physics, vol. 68, No. 3, p. 733-753, 1996.
Gottesman, D. et al., "Encoding a qubit in an oscillator," arXiv preprint arXiv:0008040v3 May 13, 2001, 22 pages.
Hamilton, C. S. et al., "Gaussian boson sampling," arXiv preprint arXiv:1612.01199v2, Apr. 20, 2017, 5 pages.
Hornik, K. et al., "Multilayer feedforward networks are universal approximators," Neural networks, vol. 2, No. 5, pp. 359-366, 1989.
Killoran, N. et al., "Continuous-variable quantum neural networks," arXiv preprint arXiv, 2018, 21 pages.
Klauk, H., "Quantum Time-Space Tradeoffs for Sorting," http://arxiv.org/abs/quant-ph/0211174v2, May 22, 2003, 17 pages.
Lloyd, S. & Braunstein, S. L., "Quantum computation over continuous variables," arXiv preprint arXiv:9810082v1, Oct. 27, 1998, 9 pages.
Quesada, N., "Franck-condon factors by counting perfect matchings of graphs with loops," arXiv preprint arXiv:1811.09597v2, Dec. 19, 2018, 16 pages.
Reck, M. et al., "Experimental realization of any discrete unitary operator," Physical Review Letters, vol. 73, No. 1, pp. 58-61, and Figures, 2 pages, 1994.
Schuld, I. et al., "The quest for a quantum neural network," arXiv preprint arXiv:1408.7005v1, Aug. 29, 2014, 21 pages.
Schuld, M. et al., "Evaluating analytic gradients on quantum hardware," arXiv preprint arXiv:1811.11184v1, Nov. 27, 2018, 8 pages.
Schuld, M. et al., "Simulating a perceptron on a quantum computer," arXiv preprint arXiv:1412.3635v1, Dec. 11, 2014, 11 pages.
Shen, Y. et al., "Deep learning with coherent nanophotonic circuits," arXiv preprint arXiv:1610.02365v1, Oct. 7, 2016, 8 pages.
Steinbrecher, G. R. et al., "Quantum optical neural networks," arXiv preprint arXiv:1808.10047, Sep. 20, 2018, 9 pages.
Su, D. et al., "Conversion of gaussian states to non-gaussian states using photon number-resolving detectors," arXiv preprint arXiv:1902.02323, Apr. 19, 2019, 37 pages.
Tezak, N. & Mabuchi, H., "A coherent perceptron for all-optical learning," arXiv preprint arXiv:1501.01608v2, Mar. 28, 2015, 26 pages.
Wan, K. H. et al., "Quantum generalisation of feedforward neural networks," npj Quantum Information, 3:36, 2017, 8 pages; doi:10.1038/s41534-017-0032-4.
Weedbrook, C. et al., "Gaussian quantum information," Reviews of Modern Physics, vol. 84, No. 2, pp. 621-669, 2012.
Zhao, L. et al., "Compiling basic linear algebra subroutines for quantum computers," arXiv preprint arXiv:1110.3234v1, Feb. 27, 2019, 9 pages.

\* cited by examiner

APPARATUS AND METHODS FOR QUANTUM COMPUTING AND MACHINE LEARNING

FIELD

One or more embodiments relate to photonic circuits for quantum computing and machine learning.

BACKGROUND

Quantum computers, which rely on quantum effects, such as superposition, interference, and entanglement, to perform computation, are a promising tool to implement certain emerging applications, including data fitting, principal component analysis, Bayesian inference, Monte Carlo methods, support vector machines, Boltzmann machines, and recommendation systems. On the classical computing side, the development of classical neural networks (CNNs), such as deep learning, also shows great potential due to new software libraries and powerful special-purpose computational hardware. Instead of bit registers in digital computing, the fundamental computational units in deep learning are continuous vectors and tensors that are transformed in high dimensional spaces. At the moment, these continuous computations are usually approximated using conventional digital computers. Quantum computers may provide an intriguing platform for exploring new types of neural networks, such as quantum neural networks (QNNs) or hybrid classical-quantum neural networks. To date, however, no known hardware platform is available to implement universal quantum computation and artificial neural networks (both classical and quantum) at the same time.

SUMMARY

Some embodiments described herein relate generally to photonic circuits for quantum computing and machine learning, and, in particular, to a universal platform that is capable of implementing classical neural networks (CNNs), quantum computing (QC), and quantum neural networks (QNNs). In some embodiments, an apparatus includes a plurality of processing layers coupled in series. Each processing layer in the plurality of processing layers includes a Gaussian unit configured to perform a linear transformation on an input signal including a plurality of optical modes. The Gaussian unit includes a network of interconnected beamsplitters and phase shifters and a plurality of squeezers operatively coupled to the network of interconnected beamsplitters and phase shifters. Each processing layer also includes a plurality of nonlinear gates operatively coupled to the Gaussian unit and configured to perform a nonlinear transformation on the plurality of optical modes. The apparatus also includes a controller operatively coupled to the plurality of processing layers and configured to control a setting of the plurality of processing layers.

In some embodiments, a method includes propagating an input signal through a plurality of processing layers connected in series. The input signal includes a plurality of optical modes. The propagation of the input signal through the plurality of processing layers includes performing a linear transformation on the plurality of optical modes using a Gaussian unit and performing a nonlinear transformation on the plurality of optical modes using a plurality of nonlinear gates. The Gaussian unit includes a network of interconnected beamsplitters and phase shifters and a plurality of squeezers that is operatively coupled to the network of interconnected beamsplitters and phase shifters. The method also includes sending an output signal from the plurality of processing layers.

In some embodiments, a reconfigurable computing device includes a plurality of processing layers coupled in series and configured to receive an input signal including a plurality of optical modes. Each processing layer includes a Gaussian unit configured to perform a linear transformation on the plurality of optical modes and a plurality of nonlinear gates configured to perform a nonlinear transformation over the plurality of optical modes. The Gaussian unit includes a network of interconnected beamsplitters and phase shifters, a plurality of squeezers operatively coupled to the network of interconnected beamsplitters and phase shifters, and a plurality of displacers operatively coupled to the plurality of squeezers and the network of interconnected beamsplitters and phase shifters. The reconfigurable computing device also includes a controller operatively coupled to the plurality of processing layers and configured to switch the apparatus between a first mode to implement a classical neural network, a second mode to implement a quantum computation, and a third mode to implement a quantum neural network. During the first mode, a first portion of the network of interconnected beamsplitters and phase shifters is configured to form a first interferometer to apply a first phase-less transformation on the plurality of optical modes, the plurality of squeezers is configured to apply a position-only squeezing to the plurality of optical modes, a second portion of the network of interconnected beamsplitters and phase shifters is configured to form a second interferometer to apply a second phase-less transformation on the plurality of optical modes, the plurality of displacers is configured to apply a position-only displacement to the plurality of optical modes, and the plurality of nonlinear gates is configured to apply the nonlinear transformation between a first set of position eigenstates and a second set of position eigenstates of the plurality of optical modes. During the second mode, at least one of the Gaussian unit or the plurality of nonlinear gates is configured to create an entanglement or a superposition in the plurality of optical modes. During the third mode, at least one of the Gaussian unit or the plurality of nonlinear gates is configured to create the entanglement or the superposition in the plurality of optical modes, and the controller is configured to change a setting of the plurality of processing layers based on an output signal from the plurality of processing layers.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
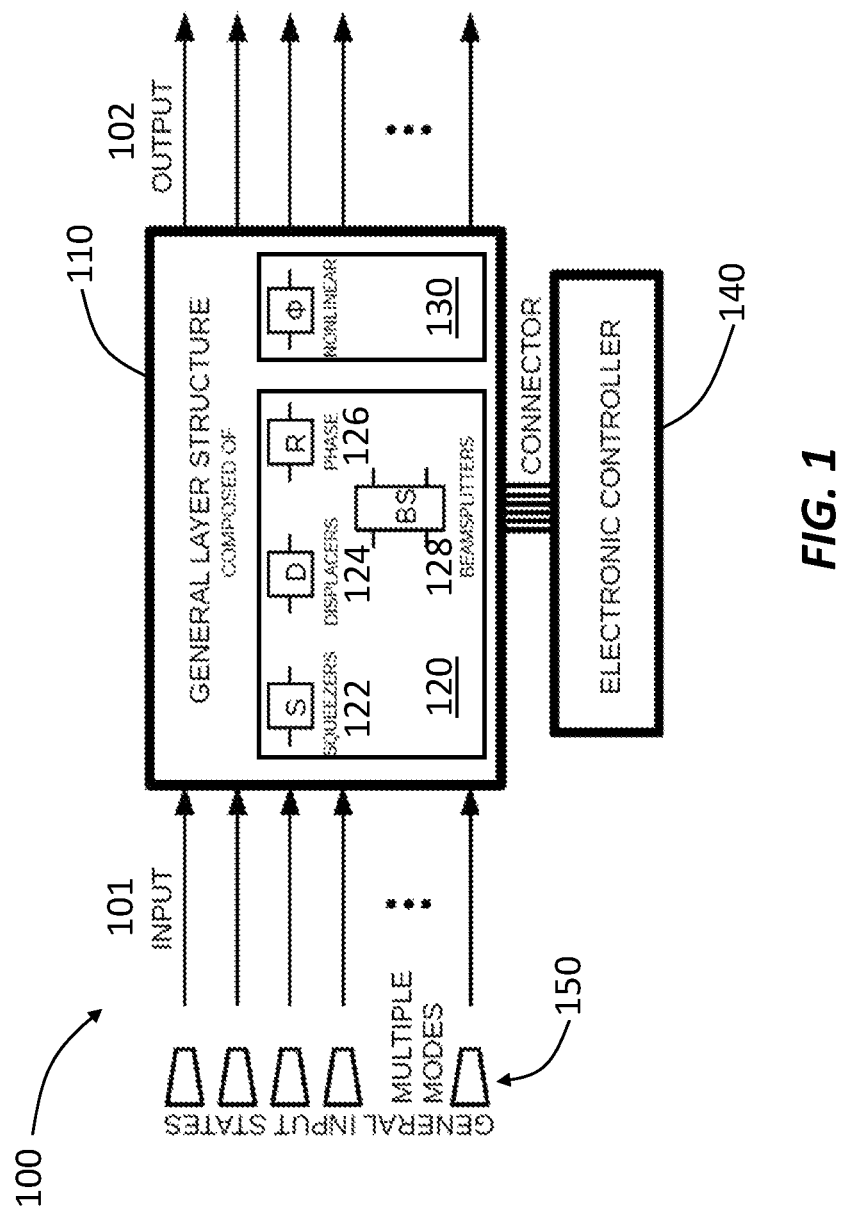
FIG. 1 shows a schematic of an apparatus for quantum computing and machine learning, according to an embodiment.

Some embodiments described herein relate to photonic circuits that are capable of implementing universal quantum computation and artificial neural networks, both classical and quantum. The circuits are constructed by photonic quantum gates, such as squeezing gates (also referred to as squeezers), displacement gates (also referred to as displacers), beamsplitters, phase gates (also referred to as phase shifters), and nonlinear-optical gates. These photonic quantum gates are combined into a programmable layer that is configured to process light that passes through the layer (e.g., linear and/or nonlinear transformations) and thereby implement quantum computing (QC), classical neural network (CNN), and/or quantum neural network (QNN).

Quantum computers function in a fundamentally different way compared to classical computing devices. Using quantum mechanics, quantum computers show great potential for increased computational power by, e.g., reducing processing time and handling bigger data. The manufacture of a quantum computer typically involves the ability to implement and dynamically control quantum gates, which can be seen as the analog of classical electronic components, such as transistors and resistors. For large scale quantum computers, it can also be beneficial to implement micro-scale and/or nano-scale quantum gates (e.g., on integrated circuits), as well as being able to protect these gates from noise.

Photons (i.e., particles of light) can be a promising medium to probe and exploit quantum mechanics. This approach has a number of advantages, including low noise, capability of room temperature operation, fast and energy-efficient computation, and scalability using developed photonic quantum gates (e.g., squeezers, displacers, beamsplitters, phase shifters, and nonlinear gates). These gates represent the transformation they carry out on quantum states, and they can be implemented physically in a variety of ways, at both the macroscopic scale and the micro- and nano-scale. These photonic quantum gates can be manufactured using integrated photonics circuits and/or bulk optical elements.

Artificial neural networks are an alternative paradigm to conventional computing, enacting algorithms by passing information through a series of programmable layers. The information at each layer is typically represented by a continuous valued vector, and each consecutive layer applies a linear affine transformation followed by a non-linear activation function. Neural networks are capable of universal function approximation, and are particularly useful as flexible function approximators in machine learning and optimization. As used herein, CNNs refer to artificial neural networks based on classical computing (e.g., using classical effects of photons), and QNNs refer to artificial neural network based on quantum computing (e.g., using quantum effects of photons, such as entanglement and superposition).

In general, the overall goal of a QNN is to duplicate, either exactly or with very high fidelity, the transformations or properties of artificial neural networks using quantum computers. This means to achieve the transformation x→φ (Wx+b) directly on a quantum computer, where x is input states, W is a weight matrix, b is a bias vector, and co is a nonlinear function. In other words, a QNN is to implement the powerful nonlinear and nonreversible functions provided by artificial neural networks naturally within the linear unitary dynamics of a quantum computer. Once such duplication is achieved, one can then naturally extend those neural networks to take advantage of the computational properties of quantum physics, such as superposition, entanglement, and interference.

Most known approaches to implement QNNs struggle to reconcile nonlinear neural network transformations with the linear structure of quantum evolution that occurs in quantum computing. Several approaches may be used to address this issue. For example, one approach uses a repeat-until-success procedure, in which the nonlinear activations are carried out by using a measurement and the process is repeated many times unless some desired measurement outcome is obtained. The running time of this repeat-until-success procedure is usually not deterministic, i.e., it can take many repetitions to enact the desired nonlinearity. As a result, this approach has severe reliability and scalability issues, especially when implemented on quantum computers having limited coherence time and on large fault-tolerant devices, where the overhead from each repeat-until-success sub-circuit can accumulate. The resulting systems may take even a longer time to carry out a nonlinear function compared to classical computers. In addition, the system may also include many additional quantum gates or iterative loops, thereby creating additional overhead (e.g., in terms of both running time and resources).

Some approaches use photonics as the information carriers. These approaches, however, are restricted to classical light without leveraging features and properties of quantum mechanics, such as the ability to work in different bases, the ability to create superposition and entanglement with respect to a chosen basis, quantum interference effects, and the ability to manipulate and resolve individual quanta of light (i.e., photons). Some other approaches use a photonic scheme for implementing a quantum variant of neural networks. These approaches, however, do not propose or suggest how to use the proposed photonic architecture to implement a classical neural network faithfully, nor as a universal quantum computer.

Apparatus and methods described herein employ quantum photonic gates to implement linear and nonlinear transformations with little or no overhead. By leveraging the unique properties of quantum photonic systems, apparatus and methods described herein can implement the nonlinear neural network transformation x→φ(Wx+b) in a reversible manner, and with various choices of activation function available. Furthermore, the resulting device can be very flexible, free of architectural or theoretical restrictions on the width or depth of the neural network that can be implemented.

FIG. 1 shows a schematic of an apparatus 100 for universal quantum computing and machine learning, according to an embodiment. The apparatus 100 includes a plurality of processing layers 110 coupled in series (only one processing layer 110 is shown in FIG. 1 for illustration purposes). The output from one processing layer is typically sent to the next processing layer as the input (see, e.g., FIG. 3). Each processing layer 110 includes a Gaussian unit 120 and a nonlinear unit 130. The Gaussian unit 120 is configured to perform a linear transformation on an input signal 101 including a plurality of optical modes. To this end, the Gaussian unit 120 includes a network of interconnected beamsplitters 128 and phase shifters 126 and squeezers 122 operatively coupled to the network of interconnected beamsplitters 128 and phase shifters 126. The nonlinear unit 130 includes a plurality of nonlinear gates operatively coupled to the Gaussian unit 120 and configured to perform a nonlinear transformation on the optical modes. The apparatus 100 also includes a controller 140 operatively coupled to the processing layers 110 and configured to control the setting of the processing layers 110.

In some embodiments, the Gaussian unit 120 can also include displacers 124 operatively coupled to other components in the Gaussian unit 120. The components in the Gaussian unit 120 can be arranged in various ways. In some embodiments, the Gaussian unit 120 can apply squeezing using the squeezers 122 on all optical modes in the input signal 101, followed by passing the input signal through an interferometer formed by the network of interconnected beamsplitters 128 and phase shifters 126. Then the displacers 124 are used to apply a displacement on all optical modes in the input signal 101. In some implementations, the beamsplitters 128 and the phase shifters 126 can form two linear interferometers with the squeezers 122 disposed in between. The displacers 124 are then used to apply displacement to the optical modes in the input signal 101 (see, e.g., FIG. 2 and descriptions below).

In some embodiments, the apparatus 100 also includes a light source 150 to provide the input signal 101 that includes an array of optical modes. Alternatively, the input signal 101 can be provided from a communication channel in optical communication with the apparatus 100. In some embodiments, the input signal 101 can be provided by another photonic device, a physical quantum system, or an upstream processing layer, among others. In some embodiments, the input signal 101 can include an encoded optical signal. In some embodiments, the input signal 101 can include an electronic signal and then be converted into an optical signal within the apparatus 100 by a converter (not shown in FIG. 1).

In some embodiments, the input signal 101 can include optical signals without encoding (i.e., vacuum states). In these embodiments, the first one or more processing layers can be used to prepare the desired input states (e.g., via squeezing and displacement). More details can be found below with references to FIGS. 6 and 7.

In some embodiments, the apparatus 100 includes an input interface to receive the input signal 101 and couple the input signal 101 into the processing layers 110. For example, the input interface can include an array of waveguides to receive the input signal 101 that includes an array of optical modes (e.g., a spatial array). In some embodiments, the input signal 101 can be sent into the processing layers 110 without a separate input interface. For example, the waveguides in the beamsplitters 128 can be used as the input interface. In some embodiments, the apparatus 100 can include a separate output interface (not shown in FIG. 1) to send out the output signal 102. In some embodiments, the output signal 120 can be sent out of the processing layers 110 via waveguides that are part of the processing layers 110.

In some embodiments, at least a portion of the apparatus 100 can be constructed based on integrated photonics. For example, the processing layers 110 and the light source 150 can be fabricated on the same substrate (e.g., semiconductor, sapphire, etc.). In some embodiments, the apparatus 100 can be constructed using bulk optics.

In some embodiments, the apparatus 100 further includes a detection unit (not shown in FIG. 1) configured to measure the output signal 102. In some embodiments, the detection unit includes an array of single photon detectors (SPDs), each of which is configured to measure the photon number in a corresponding optical mode in the output signal 102. In some embodiments, the detection unit can include a homodyne detector and/or a heterodyne detector.

In some embodiments, the nonlinear gates in the nonlinear unit 130 can include cubic phase gates or Kerr gates. Different nonlinear gates can be used within the same processing layer 110 or within the apparatus 100.

In some embodiments, the nonlinear gates can be replaced with nonlinear channels or nonlinear operations that are carried out by measurement of a subset of one or more optical modes, followed by conditional transformations on a subset of the modes or a post-selection on certain measurement events. The conditional transformation can be, e.g., an application of squeezers with parameters set based on processing of the output measurements. The post-selection can be, e.g., on the event of acquiring single photons in each measured mode during a Fock (i.e., photon-number) basis measurement. The conditional transformations can be carried out in several ways. In some implementations, the conditional transformation can be performed on the modes that are not measured. In some embodiments, the conditional transformation can be performed on modes that are measured. In some embodiments, the conditional transformation can be performed on some modes that are measured and some modes that are not measured.

If the conditional transformations are performed on modes that are measured, new inputs are injected into the next layer to replace the measured modes, and the states of these input modes can be conditional on the measurement results from the previous layer. The resulting effect of these operations is the application of a non-Gaussian (or nonlinear) transformation on the state of the optical system via a measurement-induced process.

The controller 140 in the apparatus 100 is configured to control the setting of the processing layers 110. The controller 140 can be operatively coupled to each beamsplitter 128 and phase shifter 126 in the network of interconnected beamsplitters and phase shifters, each squeezer 122, each displacer 124 (if included in the apparatus 100), and each nonlinear gate 130, thereby increasing the degree of control over the processing layers 110. In some embodiments, the change of the setting can be achieved via electrical signals (e.g., change the voltage applied over phase shifters 126), and the controller can include a classical computer or processor.

In some embodiments, the controller 140 is operatively coupled to the output of the apparatus 100. For example, information of the output signal 102 is sent to the controller 140, which in turn changes the setting of the processing layers 110 based on the received information. This feedback scheme can be used to construct an artificial neural network, in which the controller 140 can adjust the setting of the processing layers 110 if the measured result of the output signal 102 is different from the desired result.

In some embodiments, the apparatus 100 can be configured to implement continuous variable (CV) quantum computing as follows. The CV quantum computing leverages the wavelike properties of photons. Quantum information is encoded not in qubits, but in the quantum states of fields, such as the electromagnetic field, thereby making it suitable to photonic hardware. The observables in the CV picture, e.g., position and/or momentum p, have continuous values, but qubit computations can also be embedded into the quantum field picture, so there is no loss in computational power by taking the CV approach.

In CV quantum computing, the input signal 101 is split up into multiple spatiotemporal modes (e.g., as illustrated in FIG. 1). Each mode can represent a given path of light along an interferometer formed by beamsplitters 128 and phase shifters 126. Multiple choices of basis are available for describing photonic quantum systems, including, but not limited to: (i) the eigenstates of the quantum-mechanical position operator $\hat{x}$; (ii) the eigenstates of the quantum-mechanical momentum operator $\hat{p}$ (i.e., the quantum Fourier transform of position); (iii) the Fock basis states $\{|n\rangle\}$, each representing a fixed number of photons; (iv) the over-complete basis of coherent states; and (v) a dual-rail or multiple-rail encoding where a computational basis is formed based on the location of a single photon amongst multiple modes.

Without being bound by any particular theory or mode of operation, the tensor product of position eigenstates in an N-mode system is given by:

$$|x\rangle = |x_1\rangle \otimes \ldots \otimes |x_N\rangle, \quad (1).$$

where $x=(x_1, \ldots, x_N)$ is an N-dimensional real vector. The states of an N-mode system can be written as:

$$|\psi\rangle = \int dx \, \psi(x) |x\rangle \quad (2)$$

with the wavefunction $\psi(x) \in C^N$ satisfying $\int dx |\psi(x)|^2 = 1$.

The quantum system evolves via a unitary transformation $\hat{U}_H = \exp(-it\hat{H})$ acting on $|\psi\rangle$, where $\hat{H} = H(\hat{x}_1, \ldots, \hat{x}_N, \hat{p}_1, \ldots, \hat{p}_N)$ is the Hamiltonian of the system and is a polynomial of position and momentum operators $\hat{x}_i$ and $\hat{p}_i$, respectively. Such evolutions can be realized in the apparatus 100 through quantum photonic gates that form a universal gate set. In some embodiments, a universal gate set includes two-mode beamsplitters 128 and the following single mode gates: squeezers 122, displacers 124, phase gates 126, and a single fixed class of nonlinear gates 130. Furthermore, the beamsplitters 128 and phase shifters 126 can be combined to create an N-mode linear-optical interferometer. Any appropriate combination of interferometers, squeezers, displacers and phase shifters can perform a so-called Gaussian transformation (and accordingly such a combination is referred to as a Gaussian unit herein).

In some embodiments, a fixed nonlinear gate 130 (also referred to as a non-Gaussian unit) can be generated by any Hamiltonian with a polynomial degree of 3 or higher. The combination of the Gaussian unit 120 with a single fixed nonlinear gate 130 can be used for universal CV quantum computation, i.e., any unitary generated by a Hamiltonian, which is polynomial in $\hat{x}$ and $\hat{p}$ can be constructed by building up from these elementary gates using a polynomial-depth circuit.

The single-mode elementary gates (e.g., squeezers 122, displacers 124, and phase shifters 126) and two-mode beamsplitters 128 have a number of controllable free parameters, which can be used to alter the unitary transformation performed by the processing layers 110. These parameters include, for example, squeezing factor of the squeezers 122, amount of displacement applied by the displacers 124 (in the position and/or momentum plane), phase shift introduced by the phase shifters, and split ratio of the beamsplitters 128. The configuration of these parameters is also referred to as the setting of the processing layers 110.

In some embodiments, the setting of the processing layers 110 can be predetermined. In some embodiments, the setting of the processing layers 110 can be set dynamically, e.g., following a machine learning paradigm.

In some embodiments, a user can control these parameters to select the quantum algorithm to be implemented by the apparatus 100 (also referred to as operation mode of the apparatus 100, such as quantum computing, CNN, or QNN). For example, the user can select the operation mode via the controller 140, which can include a classical computer with a user interface to facilitate the mode selection.

The optical modes described above are represented by their wavefunctions. Alternatively, an equivalent representation of optical modes can be given by Wigner functions, which represent the state of a given mode as a quasi-probability distribution in the phase space of position and momentum operators. While unitary evolutions of a quantum system are generally a linear transformation on wavefunctions, the corresponding Wigner function transformation can be nonlinear. Gaussian transformations perform a linear (or affine) phase space transformation, while non-Gaussian transformations can perform non-linear phase space transformations. On the other hand, optical interferometers are often referred to as linear.

It is also worth noting that the unitary transformations carried out by linear optical interferometers (e.g., formed by beamsplitters 128 and phase shifters 126) are not the same as the unitary transformations carried out by the full layers 110 of the apparatus 100. More specifically, the interferometers carry out unitary transformations on the collection of creation and annihilation operators of the optical modes (or, equivalently, on the quadrature operators). These transformations correspond to finite-dimensional unitary matrices. In contrast, the full layers 110 enact unitary transformations on the wavefunctions, i.e., in the continuous space of square-integrable functions. These transformations correspond to infinite-dimensional linear transformations. As used here, the nonlinear gates 130 correspond to gates enacting non-Gaussian transformations.

In some embodiments, the apparatus 100 is configured as a general-purpose photonic quantum computer, which is a reconfigurable computing device that can perform a range of user-defined processes and methods through transformations and measurements on a quantum system. For example, the apparatus 100 can be switched between three operation modes: classical neural network (CNN), quantum computing (QC), and quantum neural network (QNN).

To implement a CNN, the apparatus 100 can be configured as follows. The network of interconnected beamsplitters 128 and phase shifters 126 can be divided into two portions. The first portion forms a first interferometer to apply a first phase-less Gaussian transformation on the optical modes, followed by the squeezers 122 to apply a position-only squeezing (i.e., without squeezing in the momentum) to the optical modes. The second portion of the network of interconnected beamsplitters 128 and phase shifters 126 forms a second interferometer to apply a second phase-less Gaussian transformation on the optical modes after the squeezers 122. The displacers 124 are configured to apply a position-only displacement to the plurality of optical modes (i.e., no displacement in the momentum). In addition, the nonlinear gates 130 can be configured to apply the nonlinear transformation between a first set of position eigenstates and a second set of position eigenstates of the optical modes. More details of the CNN mode can be found below with reference to FIG. 6.

To implement QC, the apparatus 100 can be configured as follows. A first portion of the network of interconnected beamsplitters 128 and phase shifters 126 is configured to form a first interferometer to apply a first phase-sensitive Gaussian transformation on the optical modes in the input signal 101, followed by the squeezers 122 configured to apply squeezing along an arbitrary axis in a position-momentum plane to the optical modes. A second portion of the network of interconnected beamsplitters 128 and phase shifters 126 is configured to form a second interferometer to apply a second phase-less transformation on the optical modes. The displacers 124 are configured to apply a displacement in position and momentum to the plurality of optical modes, and the nonlinear gates 130 are configured to apply an arbitrary nonlinear transformation (e.g., cubic phase gate or Kerr gate) to the plurality of optical modes. In some embodiments, the apparatus 100 can implement QC by creating quantum effects (e.g., entanglement or superposition) in the optical modes. These quantum effects can be created by the Gaussian unit 120 and/or the nonlinear gates 130.

To implement a QNN, the apparatus 100 can be configured as follows. The Gaussian unit 120 and the nonlinear gates 130 can be configured the same way for QC as described above. In addition, the controller 140 is configured to change the setting of the processing layers 110 based on the output signal 102 from the processing layers 110. More details about the QNN mode can be found below with reference to FIG. 7.

In some embodiments, the change of the operation mode (e.g., between QC, CNN, and QNN) can be achieved manually by a user. For example, the user can manually change the setting of the processing layers. In some embodiments, the change of the operation mode can be achieved by the controller 140. Once the user selects a given mode, the controller 140 can automatically adjust the setting of the processing layers 110 to switch the apparatus 100 into the given mode.

In some embodiments, the processing layers 110 can be configured to implement a transformation that preserves a certain subset of CV quantum states. This subset can be discrete, e.g., as defined by a dual-rail or multiple-rail encoding, thereby allowing for the encoding of qubit- and/or qudit-based quantum systems within the quantum optics hardware in the apparatus 100. The configuration also allows for universal qubit- or qudit-based quantum computation by concatenating layers.

In other words, this configuration allows qubit based quantum computation within the CV setting. In some embodiments, one can encode qubits using the dual rail encoding. For example, the |10> state of 1 photon in mode 1 and 0 photons in mode 2 can be mapped to the qubit state |0>, while |01> can be mapped to the qubit state |1>. The set of CV gates can then be configured to map within the |10> and |01> subspace so as to implement qubit-based computation. For example, this can be achieved by concatenating gates and layers together. In some embodiments, the concatenation structure can be configured by using machine learning, i.e., one can learn how the layers enact a gate (e.g., a Hadamard gate) on that qubit subspace.

Figure 2:
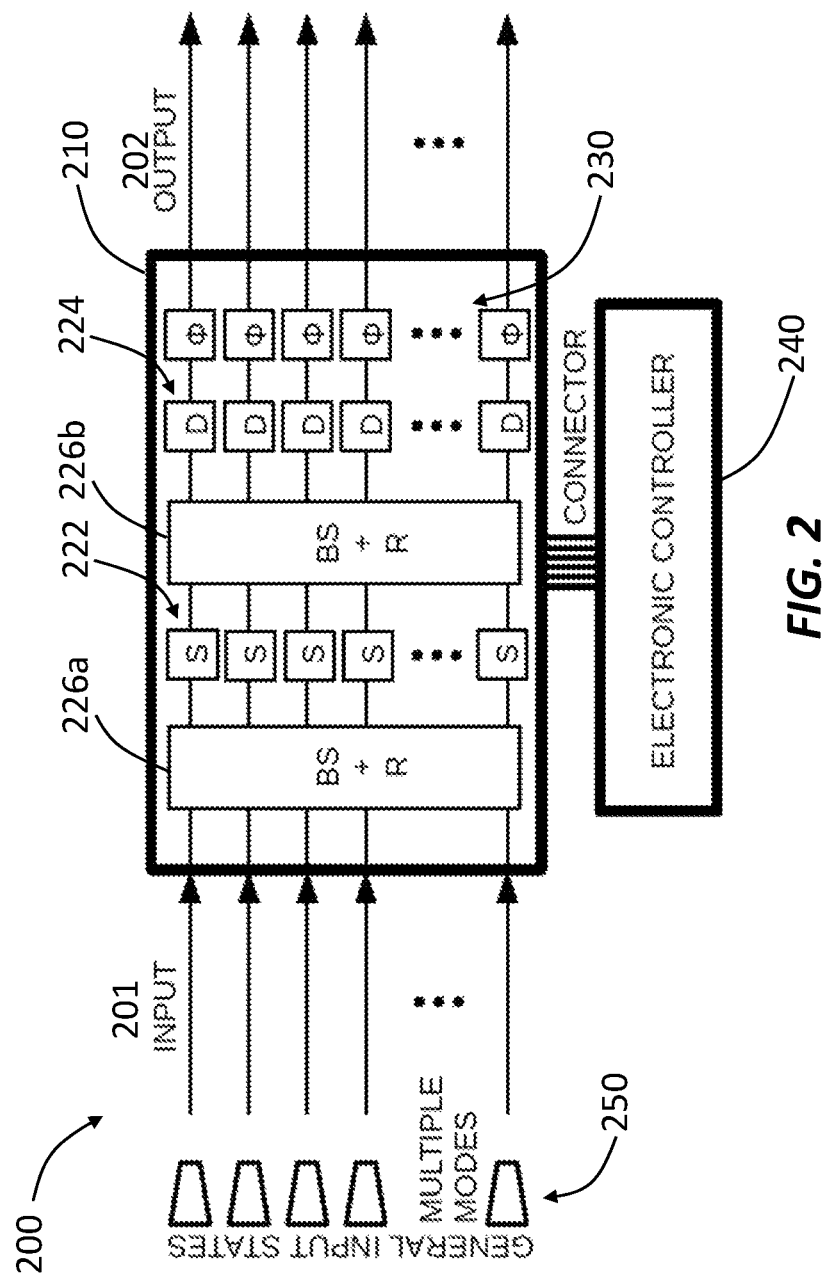
FIG. 2 shows a schematic of an apparatus including two interferometers at each processing layer for quantum computing and machine learning, according to an embodiment.

FIG. 2 shows a schematic of an apparatus 200 including two interferometers at each processing layer for quantum computing and machine learning, according to an embodiment. The apparatus 200 includes processing layers 210 connected in series (only one processing layer 210 is illustrated in FIG. 2). Each processing layer includes an array of squeezers 222 disposed between a first interferometer 226*a* and a second interferometer 226*b*. Each of the two interferometers 226*a* and 226*b* can be constructed by beamsplitters and phase shifters. In some embodiments, the beamsplitters and phase shifters can form an interferometer via the canonical Reck encoding. More details of Reck encoding can be found in, for example, M. Reck, A. Zeilinger, H. J. Bernstein, and P. Bertani, "Experimental realization of any discrete unitary operator," *Physical review letters, vol.* 73, no. 1, p. 58, 1994, which is incorporated by reference in its entirety. In some embodiments, the beamsplitters and phase shifters can form an interferometer via the Clements encoding. More details of Clements encoding can be found in, for example, W. R. Clements, P. C. Humphreys, B. J. Metcalf, W. S. Kolthammer, and I. A. Walmsley, "Optimal design for universal multiport interferometers," *Optica*, vol. 3, no. 12, pp. 1460-1465, 2016, which is incorporated by reference in its entirety.

The processing layer 210 also includes an array of displacers 224 disposed after the second interferometer 226*b*, followed by an array of nonlinear gates 230. In some embodiments, the nonlinear gates 230 can include the cubic phase gate or the Kerr gate. A controller 240 is operatively coupled to the processing layer 210 to control the setting of the processing layer 210. In some embodiments, the apparatus 200 can include a light source 250 to provide an input signal 201 including an array of optical modes. In some embodiments, the controller 240 is also operatively coupled to output of each processing layer 210 and configured to adjust the setting of each processing layer 210 based on attributes of the output signal 202. The settings to operate the apparatus 200 in different modes (e.g., QC, CNN, and QNN) can be substantially the same as for the apparatus 100.

Figure 3:
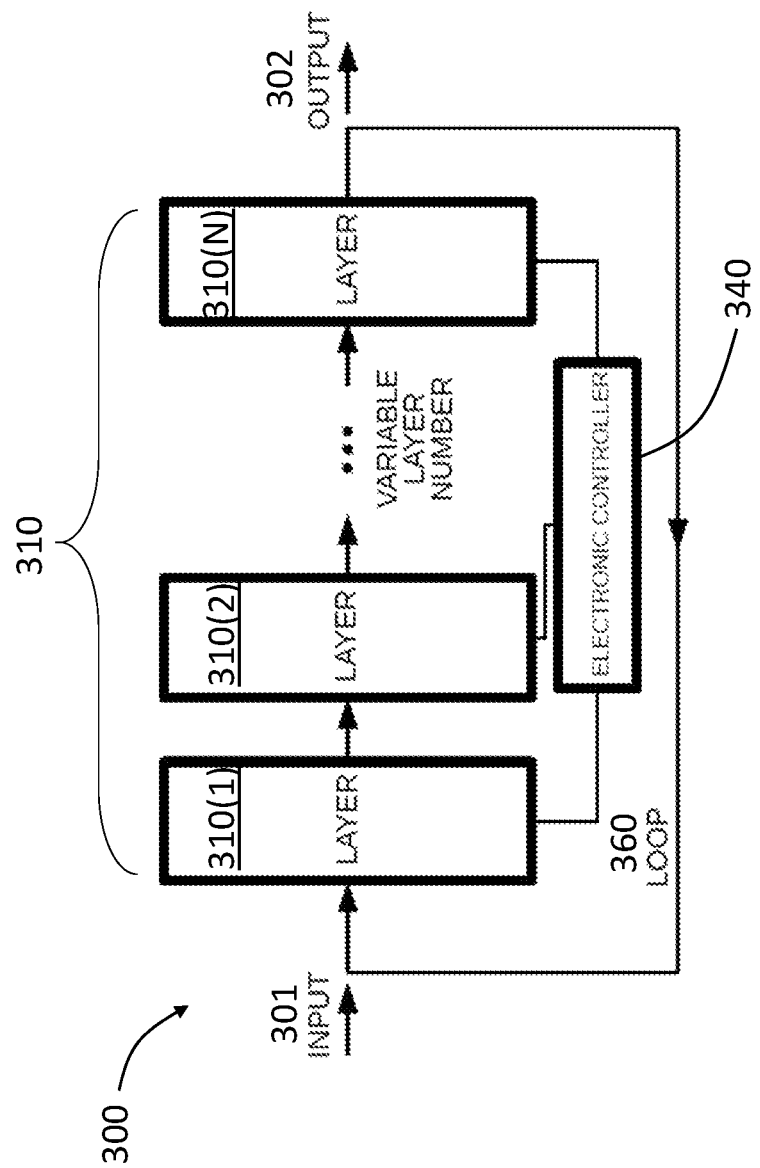
FIG. 3 shows a schematic of an apparatus including a feedback loop for quantum computing and machine learning, according to an embodiment.

FIG. 3 shows a schematic of an apparatus 300 including a feedback loop for quantum computing and machine learning, according to an embodiment. The apparatus 300 includes a series of processing layers 310(1), 310(2), . . . , and 310(N) (collectively referred to as processing layers 310), where N is a positive integer. Each processing layer 310(1) through 310(N) can be substantially identical to the processing layer 110 shown in FIG. 1. An input signal 301 is processed by the processing layers 310(1) to 310(N) to produce an output signal 302, which is then sent back, via a feedback loop 360, to the input side of the processing layers 310 as anew input signal. The apparatus 300 also includes a controller 340 operatively coupled to each processing layer 310(1) to 310(N) and configured to control the operation of the feedback loop 360 as well.

Operations of the apparatus 300 include reading in the problem/process description and data, performing processing (e.g., by the processing layers 310), and measuring the output 302 of the processing. The processing stage on the apparatus 300 involves application of an arbitrary unitary, i.e., generated by a Hamiltonian that is a polynomial of position and momentum operators to an arbitrary degree. An arbitrary unitary can be enacted by repeatedly applying the layer structure of the apparatus 300 with variable gate parameters at each layer 310(1) to 310(N).

In some embodiments, the feedback loop 360 can include one or more waveguides to send the output signal 302 (or a portion of the output signal 302) back to the input side of the processing layers 310. In some embodiments, the feedback loop 360 can include optical fibers, free-space optical elements (e.g., mirrors), and any other appropriate medium. In some embodiments, the output signal 302 can be converted into electrical signals (e.g., electronic data) and then sent back to the input end of the processing layers 310. A converter is then used to convert the electronic data back to optical signal, which is then sent to the processing layers 310 for further processing.

Figure 4:
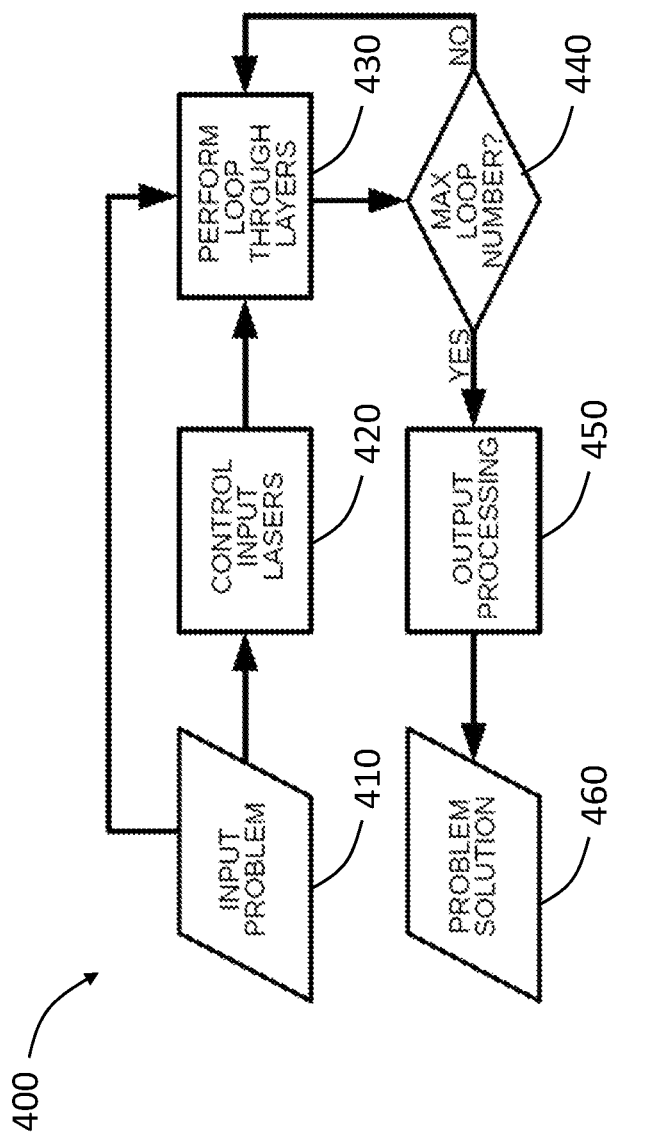
FIG. 4 is a flowchart illustrating a method of quantum computing with a feedback loop, according to an embodiment.

FIG. 4 is a flowchart illustrating a method 400 of quantum computing with a feedback loop, according to an embodiment. The method 400 includes, at 410, reading in the problem to be solved (e.g., receiving data describing the problem). At 420, initial input states are prepared for the quantum computing (e.g., using the apparatus 100 shown in FIG. 1, 200 shown in FIG. 2, or 300 shown in FIG. 3) based on the received data.

The steps 410 and 420 are also collectively referred to as the problem/process description and data read-in phase. In some embodiments, this read-in phase can be achieved by controlling input light to prepare the proper input states that enter the processing layers in the computing devices. In some embodiments, this read-in phase can be achieved by dynamically controlling the gate parameters of quantum photonic gates in one or more of the processing layers to encode the information that is read in at 410. In some embodiments, the read-in phase can be achieved by directly feeding the layer structure of the computing device with an output from another quantum device or a quantum communications network (e.g., in the form of quantum data).

The method 400 also includes, at 430, processing of the input states by performing loops through the processing layers. In some embodiments, the processing stage can be performed with one or more repetitions of the layer structure by using an electronic controller (e.g., 140 in FIG. 1, 240 in FIG. 2, or 340 in FIG. 3) to set gate parameters such that a desired quantum algorithm is implemented. In some embodiments, the user can also have the option not to apply certain quantum photonic gates in a layer by, e.g., setting the corresponding parameters to zero.

The method 400 also includes, at 440, determining whether a maximal number of loops has already been performed. If not, the method 400 returns back to step 430 for further processing through the processing layers. If a sufficient number of loops is already performed, the method 400 moves forward to 450 for output processing so as to reach problem solution at 460.

The output from the computing device (e.g., quantum computer) can be accessed through measurements. In some embodiments, the measurements can be performed on one or more modes after the final processing layer. In some embodiments, the measurements can be performed on a subset of one or more modes after the application of an intermediate processing layer. In these embodiments, the measured data can be processed and then fed forward into the computing device as the processing continues.

Feed-forward of processed measurement information can take several forms. In some embodiments, the values of gate parameters (e.g., squeezing or displacement amplitudes) in a downstream layer are determined based on the measurement result. In some embodiments, a new quantum state is prepared and the form of the new quantum state is based on the measurement result. The new quantum state is then injected into a subset of modes in a downstream layer. Once all processing has ceased and measurement data has been extracted, the data may then be processed by a classical computer to yield the output of the quantum computer.

The apparatus described herein (e.g., 100-300 in FIGS. 1-3) can also function as part of a quantum/classical hybrid system, which accordingly can leverage both quantum and classical computing resources. Quantum-classical hybrid computing devices can be a promising approach to satisfy near-term quantum computing, because they allow quantum and classical computers to perform tasks where they have best efficiency. For example, classical computers can perform sorting tasks efficiently, while quantum computers can perform prime factorization in a more efficient way.

Quantum photonic hardware described herein is able to operate at wavelengths typically used in classical optical telecommunications (e.g., about 1550 nm). Therefore, this quantum photonic hardware can be readily coupled to existing communication infrastructure using commercially available instruments (e.g., fibers).

FIGS. 5A-5D shows schematics of systems for quantum-classical hybrid computing, according to embodiments. In these schematics, solid lines represent quantum information and dashed lines represent classical information. The hashed boxes represent interfaces between quantum information and classical information. Quantum computers in FIGS. 5A-5D can include any of the apparatus described herein with references to FIGS. 1-3 above.

Figure 5B:
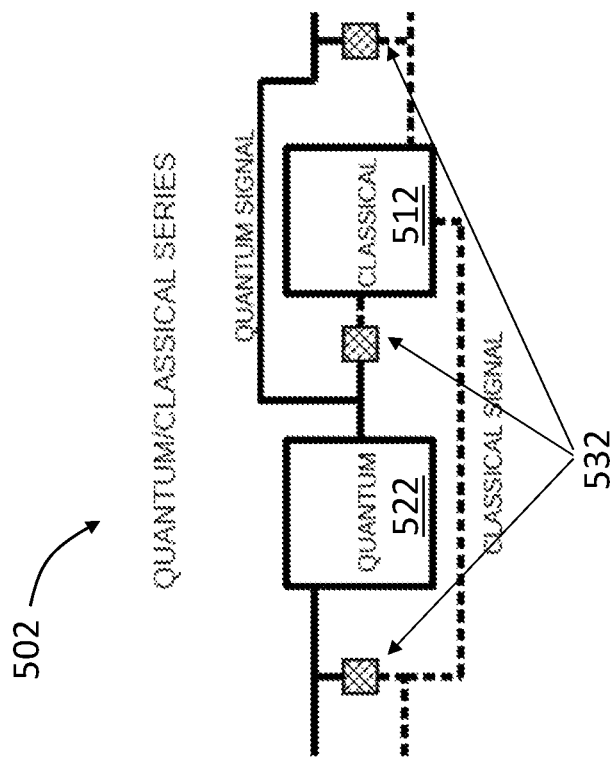
FIGS. 5A-5D shows schematics of systems for quantum-classical hybrid computing, according to embodiments.
Figure 5A:
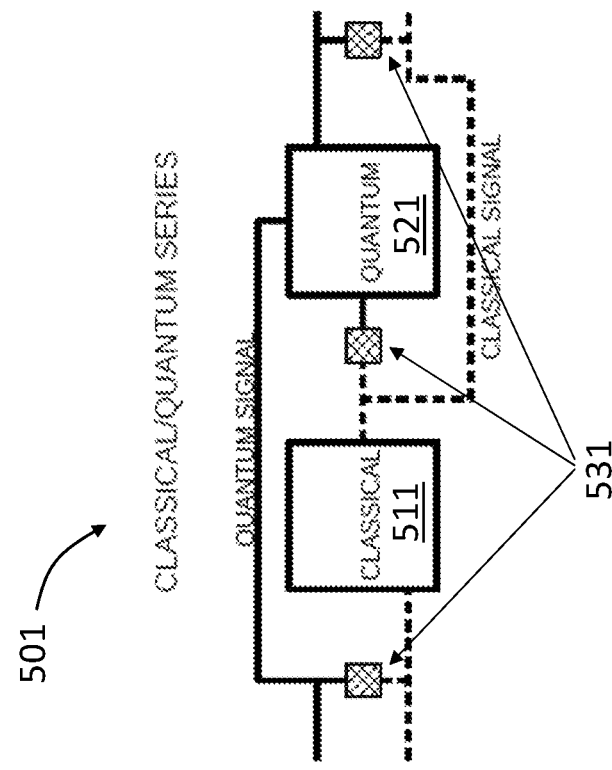

FIG. 5A shows a schematic of a system 501 including a classical computer 511 and a quantum computer 521 connected in series. Classical signals processed by the classical computer 511 are fed into the quantum computer 521 for further processing via one of the interfaces 531. In some embodiments, the interfaces 531 can include a "direct plug-in" using optical fibers that connect classical and quantum photonic devices. In some embodiments, the interfaces 531 include a device that further includes measurement of quantum signals and control of quantum photonic lasers and gates by a classical processor. In some embodiments, the interfaces 531 can include one or more processing layers described herein (e.g., 110 in FIG. 1) to facilitate the signal transmission between quantum and classical devices. For example, the processing layer in the interfaces 531 can receive vacuum state as the input and add a high degree of squeezing to each mode in the input. The processing layer can also add displacement in position to each mode. The system 501 illustrated in FIG. 5A can be used when it is more efficient to perform a partial processing of classical data before feeding the processed data to the quantum component, such as classification of credit card data as fraudulent or genuine.

FIG. 5B shows a schematic of a system 502 including a quantum computer 522 to perform pre-processing and send the pre-processed data to a classical computer 512 for further processing. Interfaces 532 are used to perform the data transfer between the classical computer 512 and the quantum computer 522. The system 502 can be used, for example, when the output signal from the quantum computer 522 is interpreted by the classical computer 512.

Figure 5D:
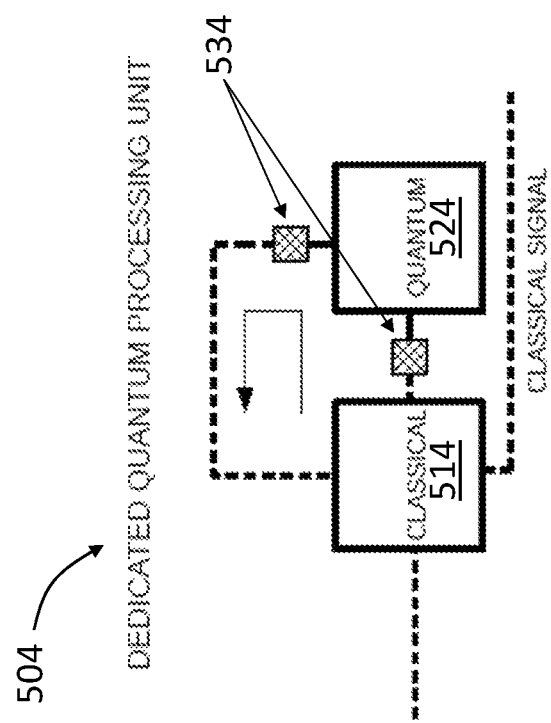
Figure 5C:
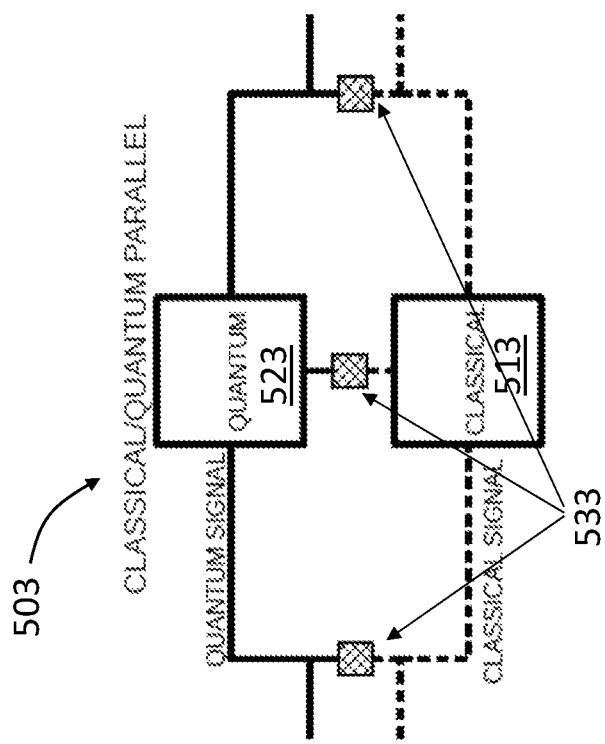

FIG. 5C shows a schematic of a system 503 including a classical computer 513 and a quantum computer 523 connected in parallel. Interfaces 533 are used to transmit data between the classical computer 513 and the quantum computer 523. In the system 503, the classical computer 513 and the quantum computer 523 act in parallel, with the potential for two-way data exchange during processing. The system 503 can be useful for applications involving a continuous two-way data stream.

FIG. 5D shows a schematic of a system 504 including a dedicated quantum processing unit 524 with a classical controller 514. In the system 504, the classical controller 514 can use the quantum processing unit 524 for dedicated processing of certain subroutines. In some embodiments, the classical controller 514 can assign multiple computations to the quantum processing unit 524 before a classical signal is read-out.

The system 504 can be used when the quantum processing unit 524 is used to calculate an intractable quantity, such as the calculation of vibronic spectra in chemistry. In these applications, the problem statement can be declared by classical computers, but the actual calculations are usually challenging or impractical for classical computers to perform.

As described herein, the computing apparatus shown in FIGS. 1-3 can also be used to implement both classical and quantum neural networks, with applications in machine learning and optimization. In general, operation as a classical neural network (CNN) can be achieved by placing certain restrictions on the parameter range of some quantum photonic gates in the layer structure, as well as inputting light and measuring in a fixed basis. Relaxing these constraints allows operation of the apparatus as a general QNN, which can be trained efficiently and also controlled to emulate certain common architectures of CNN layers, such as the convolutional layer.

Figure 6:
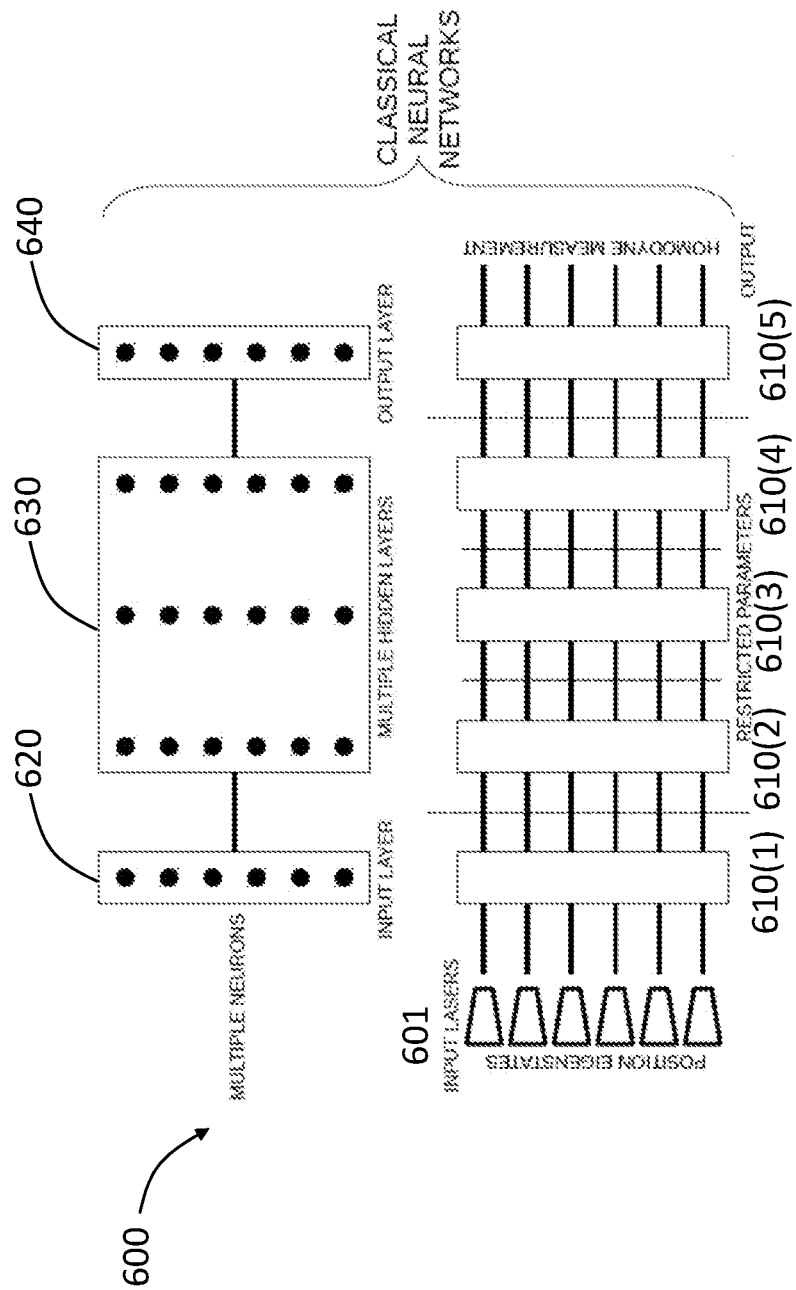
FIG. 6 shows a schematic of a classical neural network (CNN) implemented by apparatus shown in FIGS. 1-3, according to an embodiment.

FIG. 6 shows a schematic of a classical neural network (CNN) 600 implemented by apparatus 100-300 shown in FIGS. 1-3, according to an embodiment. The CNN 600 includes multiple processing layers 610(1) to 610(5) (collectively referred to as processing layers 610) to form a neural network and process an input signal 601. The processing layers 610 can be divided into three groups: an input layer 620 formed by the first processing layer 610(1), multiple hidden layers 630 formed by processing layers 610(2) through 610(4), and an output layer 640 formed by the last processing layer 610(5). Five processing layers 610 are shown in FIG. 6 for illustrating purposes only. In practice, any other number of processing layers 610 can also be used.

In some embodiments, each processing layer 610(1) to 610(5) can be substantially identical to any of the processing layers described herein (e.g., 110 in FIG. 1, 210 in FIG. 2, and 310 in FIG. 3). In some embodiments, each of the processing layers 610(2) through 610(4) can be substantially identical to any of the processing layers described herein. The input layer 620 and the output layer 640 can use other types of layers (e.g., without squeezers and/or displacers).

In the CNN 600, each layer 610(1) through 610(5) corresponds directly to a neural network layer and each mode of light in the input signal 610 corresponds to a neuron. Operation of the processing layers 610 as a CNN includes loading in some N-dimensional classical data $x \in \mathbb{R}^N$. This can be achieved by inputting the N-mode tensor product of position states $|x\rangle$ according to Equation (1). The state $|x\rangle$ can be approximately prepared by input laser light and/or using an input layer structure with high position squeezing and a position displacement of $x_i$ along mode i.

A fully connected feed-forward CNN layer (e.g., 610(2) to 610(4)) maps an N-dimensional vector to an M-dimensional vector by performing the transformation $L(x)=\varphi(Wx+b)$, where $W \in \mathbb{R}^{M \times N}$ (representing a transformation matrix having the dimension of M×N), $b \in \mathbb{R}^M$ is a bias vector having M elements, and $\varphi$ is an element wise non-linear function (such as rectified linear units or the sigmoid function). The layers 610 can perform the transformation $|x\rangle \rightarrow |\varphi(Wx+b)\rangle$ in the following way.

First, W can be decomposed using the singular value decomposition as $W=O_2 \Sigma O_1$, where $\Sigma$ is a diagonal matrix with positive entries and $O_i$ (i=1, 2) are orthogonal matrices. Each layer in the processing layers 610 first applies $O_1$ by restricting the first set of beamsplitters and phase gates (forming an interferometer) to phase-less transformations, resulting in $|x\rangle \rightarrow |O_1 x\rangle$. Next, squeezers in the processing layer are applied with a restriction to position-only squeezing, allowing for the transformation $|O_1 x\rangle \rightarrow |\Sigma O_1 x\rangle$ by appropriately controlling gate parameters of the squeezers. The second set of beamsplitters and phase gates (forming another interferometer) is also restricted to phase-less transformations, resulting in $|\Sigma O_1 x\rangle \rightarrow |O_2 \Sigma O_1 x\rangle = |Wx\rangle$. When the input and output dimensions of W do not match (i.e., M is not equal to N), the layer structure is composed of max{M, N} modes.

Addition of a bias vector b can be achieved by restricting displacers on each mode to position-only displacement. This results in the transformation $|Wx\rangle \rightarrow |Wx+b\rangle$. Finally, a nonlinear function $\varphi$ is applied through nonlinear gates or channels acting on each mode in the input signal 601, with the restriction that the nonlinear transformations map position eigenstates to position eigenstates, i.e., $|x_i\rangle \rightarrow |\varphi(x_i)\rangle$. This restriction can ensure that the processing through the layers 610 does not generate quantum effects, such as superposition or entanglement, amongst the position eigenstates, thereby maintaining the classical nature of the CNN 600. The result of the nonlinear gates is the transformation $|Wx+b\rangle \rightarrow |\varphi(Wx+b)\rangle$. Compounding each of the operations above, each of the layers 610 is able to perform the CNN layer transformation on position eigenstates:

$$|x\rangle \rightarrow |L(x)\rangle \quad (3)$$

The output of a given layer 610(1) through 610(5) can be read out as L(x) by performing a homodyne position measurement on each of the modes. By fixing the constrained parameters described above, a user can apply a predetermined function to the input signal 601. Instead, by allowing the constrained parameters to be variable, the user can operate the layers 610 as a CNN for machine learning. Training of the layer structure as a CNN can be performed using standard numerical or automatic differentiation techniques in combination with a classical device. For example, the training can be carried out by performing one forward pass through the layers 610, computing gradients using a numerical estimation technique (e.g., the finite-difference method) or the backpropagation algorithm (leveraging the classical coprocessor as needed), and then using the output to update parameters in the layers 610.

Figure 7:
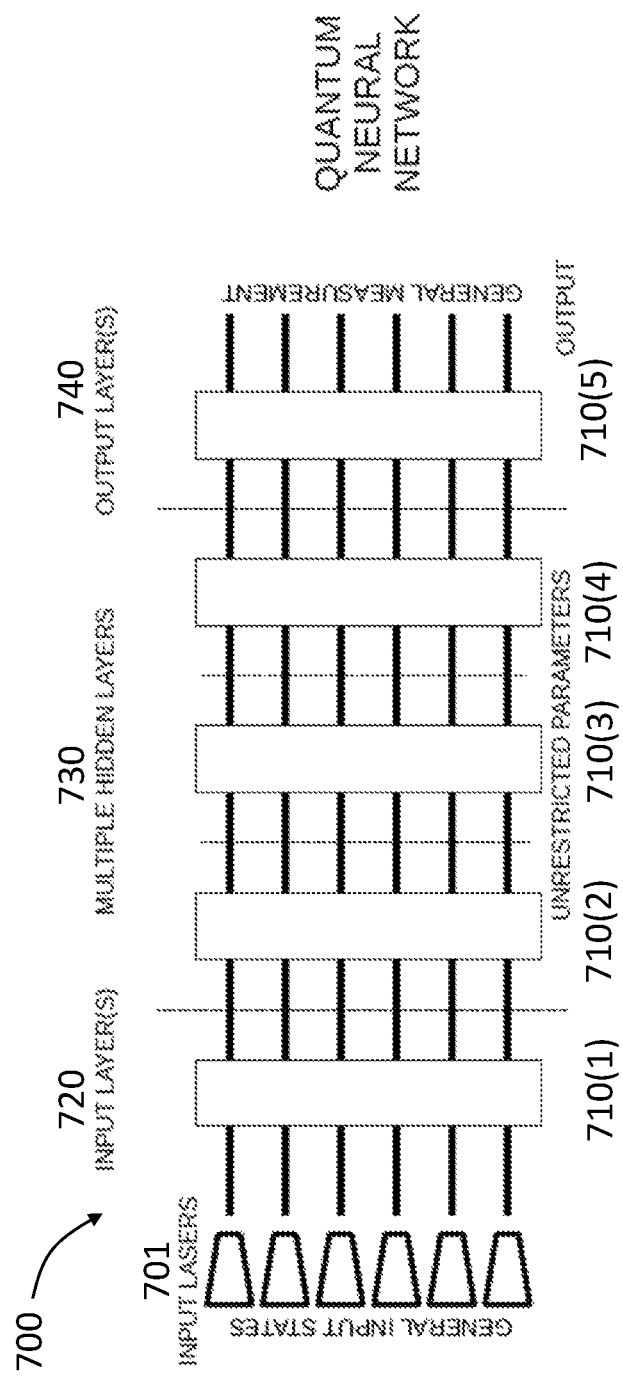
FIG. 7 shows a schematic of a quantum neural network (QNN) implemented by apparatus shown in FIGS. 1-3, according to an embodiment.

FIG. 7 shows a schematic of a quantum neural network (QNN) 700 implemented by apparatus shown in FIGS. 1-3, according to an embodiment. The QNN 700 includes multiple processing layers 710(1) to 710(5). The first processing layer 710(1) is configured as an input layer 720, the last processing layer 710(5) is configured as an output layer 740, and the middle layers 710(2) to 710(4) are configured as hidden layers 730. Each of the processing layers 710 can be substantially identical to any of the processing layers described herein (e.g., 110 in FIG. 1, 210 in FIG. 2, and 310 in FIG. 3).

The QNN 700 can operate with the following setting. Each processing layer 710 includes a first interferometer (e.g. formed by interconnected beamsplitters and phase shifters) configured to apply a first phase-sensitive Gaussian transformation on the optical modes, followed by squeezing along an arbitrary axis in the position-momentum plane to the optical modes (e.g., using squeezers). Then a second interferometer (e.g., formed by another set of interconnected beamsplitters and phase shifters) is used to apply a second phase-less transformation on the optical modes. In addition, a displacement in position and momentum to optical modes can also be applied to the optical modes (e.g., using displacers). The nonlinear gates in each processing layer are configured to apply an arbitrary nonlinear transformation to the optical modes.

Moreover, the input data and output data can also be configured in more general forms. More specifically, the user of the QNN 700 can choose any basis, including but not limited to, the momentum eigenbasis, the Fock basis, the overcomplete basis of coherent states, or the dual-/multiple-rail basis. At input, different bases can be controlled by adjusting the input lasers and/or using one or more input layer structures with arbitrary gate parameters. At output, different bases can be controlled by passing through output layer structures and/or performing measurements in different bases (e.g., the Fock basis). Quantum photonics used in the QNN 700 allows for homodyne, heterodyne, and photon-number counting measurements. In the QNN 700, the correspondence between artificial neurons and optical modes is generalized to the quantum realm: several different representations are available for encoding and interpreting data, e.g., using Fock basis states, or a basis of nonorthogonal coherent states.

The QNN 700 has a number of advantages. First, the structure of gates used in the QNN 700 can be substantially similar to gates used in a CNN (e.g., the CNN 600) but the operation of the QNN 700 allows for greater generality in the input/output data and the parameters of gates. As a result, the QNN 700 can take advantage of the quantum properties of superposition and entanglement. Second, as described with reference to FIGS. 1-3, each processing layer 710 includes a universal set of quantum photonic gates and can perform universal quantum computing, which is challenging to simulate on a classical device. The QNN 700 can be used to perform a wide range of quantum algorithms, including those that are known or believed to be intractable on classical devices. Third, the QNN 700 can perform reversible nonlinear transformations on probability distributions by making use of quantum interference effects. For comparison, CNNs are typically used to perform reversible linear transformations on probability distributions. Reversible nonlinear transformations can be useful in machine learning because they allow for greater power in expressing or representing various probability distributions.

Training of the QNN 700 can be achieved by an iterative procedure. This procedure includes, for example, defining a cost function and then iteratively updating the gate parameters in the processing layers 710 until the cost function is minimized. The minimization can be achieved via at least two approaches. First, the minimization can be achieved through simulation of the quantum hardware on classical computing devices, which allow for standard automatic differentiation techniques using the functional representation of the QNN. This option can be achieved on small-scale systems (i.e., a small mode number and/or layer number) but can quickly become impractical due to the overhead of quantum simulation as the system scale increases.

Second, the minimization can be achieved by direct evaluation of gradients on quantum hardware. This option allows for evaluation of the gradient of the cost function with respect to each gate parameter in the layer structures.

Figure 8:
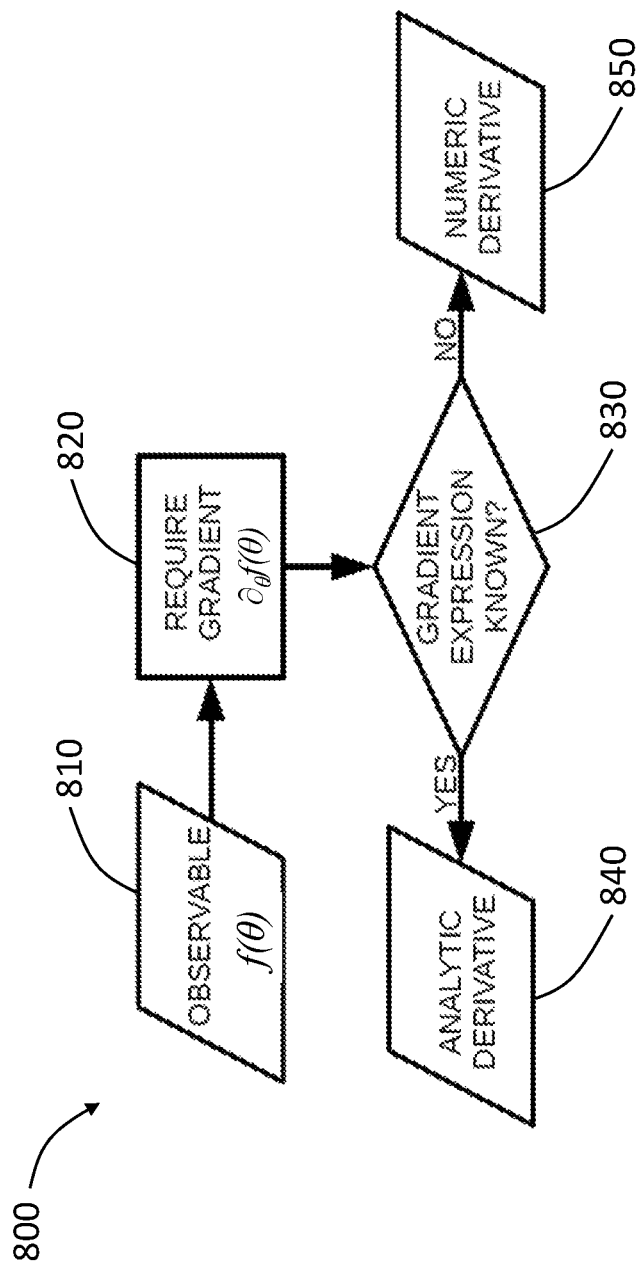
FIG. 8 is a flowchart illustrating a method of evaluating gradients with respect to a QNN, according to an embodiment.

FIG. 8 is a flowchart illustrating a method 800 of evaluating gradients with respect to a QNN, according to an embodiment. Direct evaluation of gradients can be achieved through both analytic and numeric evaluation of derivatives. The method 800 allows a user or a controller to choose which approach to use. In the method 800, an observable $f(\theta)$ is defined as the output of the QNN at 810. The observable $f(\theta)$ is a function of a gate parameter $\theta$ and is associated with the cost function.

The method 800 also includes performing gradient descent to find the optimal $\theta$ to optimize the cost function. This includes evaluation of $\partial_\theta f(\theta)$ at 820. For many types of gates, including Gaussian gates, an exact expression for the derivative can be theoretically derived, and a $\partial_\theta f(\theta)$ can be evaluated using an analytic derivative formula. Without being bound by any particular theory or mode of operation, this analytic expression has the form $$\partial_\theta f(\theta) = c[f(\theta+s) - f(\theta-s)] \quad (4)$$

where with $c \in \mathbb{R}$ and $s \in \mathbb{R}$ are fixed parameters dependent upon the gates.

Equation (4) can be evaluated using the same QNN hardware by simply running the circuit with the gate parameter shifted by $\pm s$. Due to the nature of quantum systems, evaluating $f(\theta \pm s)$ (as an expectation value) involves multiple runs of the QNN to arrive at a good estimation.

On the other hand, gradients $\partial_\theta f(\theta)$ can be estimated numerically using the finite difference method:

$$\partial_\theta f(\theta) \approx \frac{f\left(\theta + \frac{1}{2}\Delta\mu\right) - f\left(\theta - \frac{1}{2}\Delta\mu\right)}{\Delta\mu} \quad (5)$$

for a small $\Delta\mu$. The approach of evaluating Equation (5) can be similar to the analytic derivative method in that both approaches involve runs of the QNN with parameters shifted by $\pm \Delta\mu/2$. The difference between the two approaches is that the analytical approach is an exact gradient formula, using shift and scale parameters $c$ and $s$ that are determined by the gate where the parameter $\theta$ appears. In contrast, the numerical approach is an approximate gradient formula, using a small user-specified value $\Delta\mu$. When using the numerical estimation technique, there is an additional error in the approximation of $\partial_\theta f(\theta)$.

Referring back to FIG. 8, the method 800 also includes, at 830, determining whether the gradient expression is known. If the expression of the gradient is known, the method 800 then proceeds to 840, where analytical approach is used to evaluate $\partial_\theta f(\theta)$. If, however, the gradient expression is not known, then the analytical approach may not be available. In this case, the method 800 proceeds to 850, where the numerical approach is used to evaluate $\partial_\theta f(\theta)$ via Equation (5).

Figure 9:
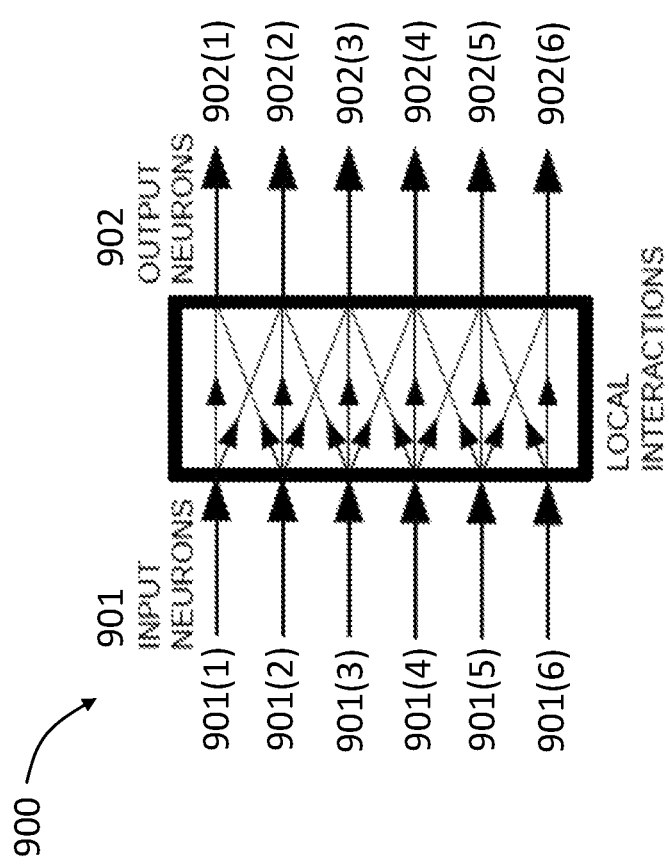
FIG. 9 shows a schematic of a convolutional processing layer that can be used for quantum computing and machine learning, according to an embodiment.

FIG. 9 shows a convolutional processing layer 900 that can be used for quantum computing and machine learning, according to an embodiment. In the convolutional layer 900, neurons are restricted to have only local connections and the connections are in general spatially homogeneous. As illustrated in FIG. 9, each neuron is represented by an optical mode 901(1) to 901(6) in the input signal 901, and each mode has connections with two output modes (for 901(1) and 901(6) at the edge) or three output modes (for 910(2) to 910(5). Reversely, each output mode 902(1) to 920(6) also has only connections with two or three input modes.

The layer 900 is also referred to as a "kernel" that is set to sweep across the data from the previous layer (e.g., image data). This can be replicated using the structure of the layer 210 shown in FIG. 2 by constraining the Gaussian elements (e.g., squeezers, displacers, beamsplitters, phase gates) to be generated by an overall Hamiltonian that is translationally invariant. In other words, if $\hat{H} = H(\hat{x}, \hat{p})$, then $\hat{H}$ does not change if ($\hat{x}_i$, $\hat{p}_i$) of mode i is mapped to ($\hat{x}_{i+1}$, $\hat{p}_{i+1}$) of mode i+1.

Figure 10:
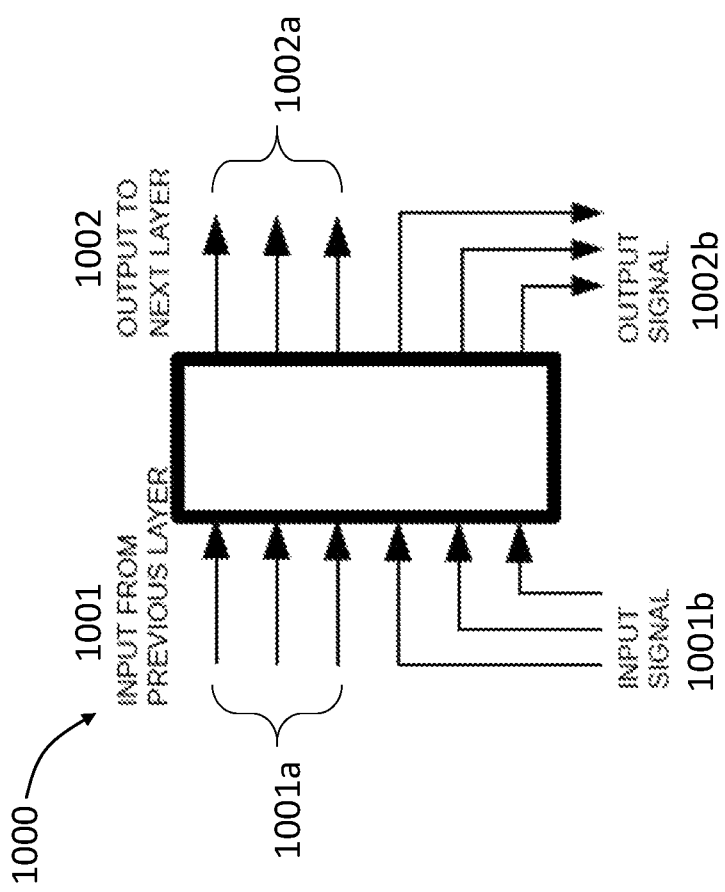
FIG. 10 shows a recurrent processing layer that can be used for quantum computing and machine learning, according to an embodiment.

FIG. 10 shows a recurrent processing layer 1000 that can be used for quantum computing and machine learning, according to an embodiment. Recurrent layers are often used for problems involving sequences of data, such as natural language or time series. The recurrent layer 1000 shown in FIG. 10 take two types of input at each layer i. The first type of data is an external input $x^{(i)}$ 1001a, which may be from an input data source. The second type of data is an internal state $h^{(i)}$ 1001b, which comes from within the recurrent neural network but from a previous layer.

In some embodiments, a subset of input modes (e.g., 1001a) to the layer 1000 are prepared according to a given signal. This preparation can be a quantum state, which may be prepared by using another layer structure, by controlling input laser light, or by feeding in from another quantum device. A subset of the remaining input modes (e.g., 1001b) can be taken from the output of a previous layer. At the output of the recurrent layer 1000, a subset of the modes (e.g., 1002a) is fed-out from the structure as an output signal. In some embodiments, the output signal 1002a can be measured in a given basis (possibly by first feeding through another layer structure of this invention). In some embodiments, the output signal 1002a is sent to another quantum device (e.g., as input signal). A subset of the remaining input modes (e.g., 1002b) can then be sent to a later layer of the neural network.

Figure 11:
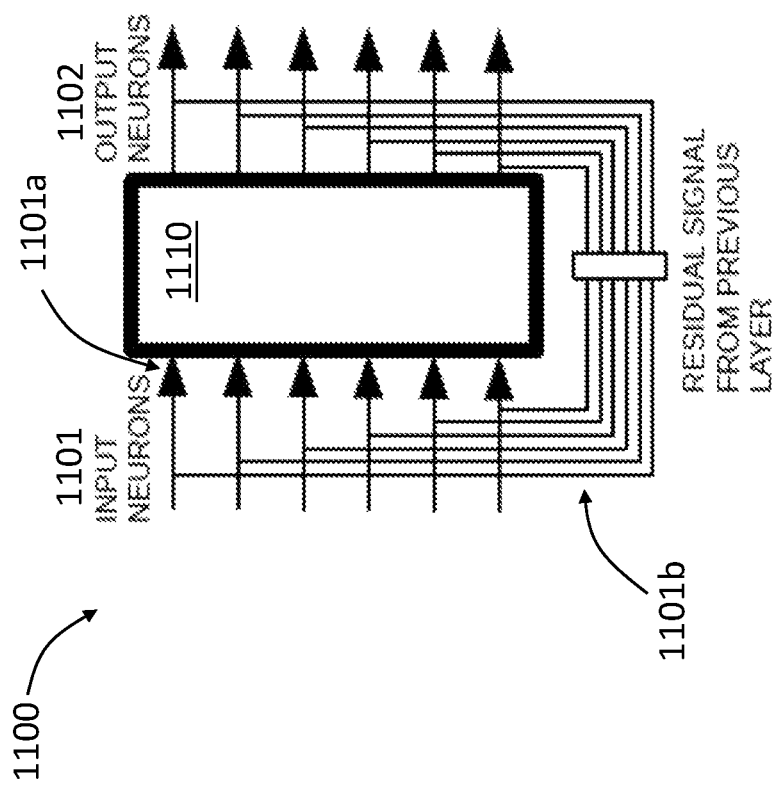
FIG. 11 shows a residual processing layer that can be used for quantum computing and machine learning, according to an embodiment.

FIG. 11 shows a residual processing layer 1100 that can be used for quantum computing and machine learning, according to an embodiment. Residual layers are often used in machine learning tasks and can provide shortcut connections that allow the input signal 1101 to be split into two parts 1101a and 1101b. The first part 1101a is sent through the layer 1110 and the second part 1101b bypasses the layer 1110. The two parts 1101a and 1101b are then recombined before being passed to the next layer. In other words, the output signal 1102 includes portions of the input signal 1101.

If the layer 1110 itself performs the transformation x→L(x), then the residual layer 1000 performs the transformation x→x+L(x). The layer structure in the layer 1100 can carry out a residual QNN layer by applying the unitary $V=\exp(i\,\hat{x}_i \otimes \hat{p}_{i+N})$ to each mode in the input signal 1101 and a corresponding ancilla mode (hence, involving 2N modes overall). This unitary carries out:

$$V|x_i\rangle \otimes |0\rangle = |x_i\rangle \otimes |x_i\rangle \quad (6)$$

on modes i and i+N, with |0> being the zero-position eigenstate. Mode i can then sent through the QNN layer and mode i+1 is routed around the QNN layer.

In some embodiments, the residual layer 1100 can have restricted parameters such that it simulates a general CNN layer. This results in the 2N mode state as |L(x)>⊗|x>. Finally, a controlled-X (or SUM) gate can be used modewise on modes i and i+N to create the state |L(x)+x>⊗|x>. The controlled-X gate can be carried out using Gaussian quantum gates. The output of the first N modes is hence a residual layer with respect to information encoded in the product position eigenbasis. The second set of N modes can be preserved until the calculation has finished. The residual layer 1100 can also accept information in any other basis and can also be operated with unrestricted gate parameters, thereby allowing the operation to go beyond the standard residual CNN layer transformations by leveraging the quantum properties of superposition, entanglement, and interference.

Figure 12:
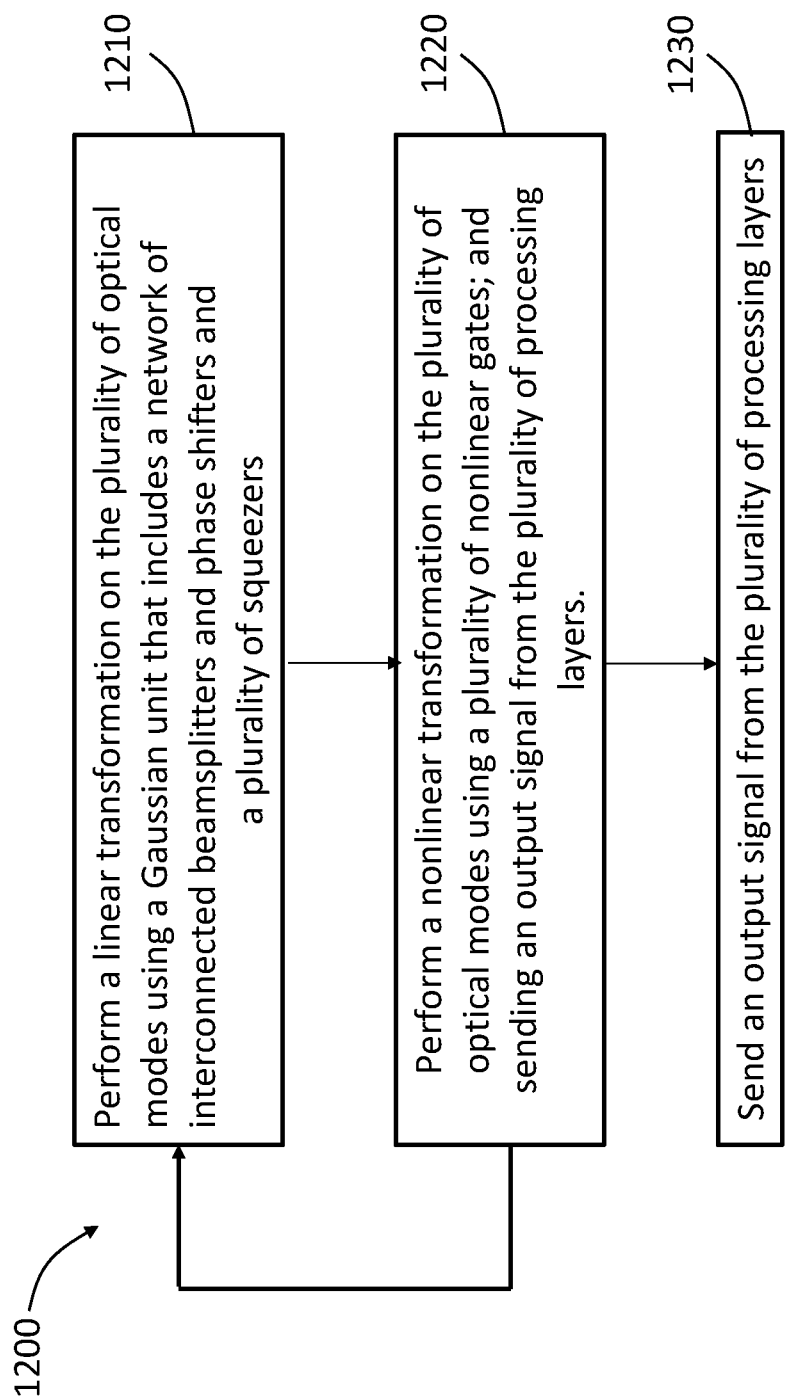
FIG. 12 is a flowchart illustrating a method of quantum computing and machine learning, according to an embodiment.

FIG. 12 is a flowchart illustrating a method 1200 of quantum computing and machine learning. The method 1200 includes propagating an input signal through a plurality of processing layers connected in series, and the input signal includes a plurality of optical modes. The propagation of the input signal includes, at 1210, performing a linear transformation on the plurality of optical modes using a Gaussian unit. The Gaussian unit includes a network of interconnected beamsplitters and phase shifters and a plurality of squeezers operatively coupled to the network of interconnected beamsplitters and phase shifters. The propagation of the input signal also includes, at 1220, performing a nonlinear transformation on the plurality of optical modes using a plurality of nonlinear gates. The output from step 1220 is then sent to another processing layer, repeating the steps 1210 and 1220 (but at another processing layer). The method 1200 also includes, at 1230, sending an output signal from the plurality of processing layers (e.g., when a sufficient number of processing layers is used).

In some embodiments, performing the linear transformation at 1210 includes several steps. First, a first phase-less transformation is applied on the plurality of optical modes using a first portion of the network of interconnected beamsplitters and phase shifters that is configured to form a first interferometer. Then, a position-only squeezing is applied to the plurality of optical modes using the plurality of squeezers, followed by applying a second phase-less transformation on the plurality of optical modes using a second portion of the network of interconnected beamsplitters and phase shifters that is configured to form a second interferometer. In addition, the linear transformation can also include applying a position-only displacement to the plurality of optical modes using the plurality of displacers. In these embodiments, applying the nonlinear transformation at 1220 includes applying the nonlinear transformation between a first set of position eigenstates and a second set of position eigenstates of the plurality of optical modes. In these embodiments, the method 1200 is configured to apply a classical neural network (CNN).

In some embodiments, performing the linear transformation at 1210 includes: (i) applying a first phase-sensitive Gaussian transformation on the plurality of optical modes using a first portion of the network of interconnected beamsplitters and phase shifters that is configured to form a first interferometer; (ii) applying squeezing along an arbitrary axis in the position-momentum plane to the plurality of optical modes using the plurality of squeezers; (iii) applying a second phase-sensitive Gaussian transformation on the plurality of optical modes using a second portion of the network of interconnected beamsplitters and phase shifters that is configured to form a second interferometer; and (iv) applying a displacement in position and momentum to the plurality of optical modes using a plurality of displacers. In addition, the nonlinear transformation at 1220 includes applying an arbitrary nonlinear transformation to the plurality of optical modes using the plurality of nonlinear gates. In these embodiments, the method 1200 can be configured to implement quantum computing (QC).

In some embodiments, at least one of the linear transformation or the nonlinear transformation on the plurality of optical modes includes creating an entanglement or a superposition in the plurality of optical modes. This also allows the method 1200 to implement QC.

In some embodiments, in addition to the setting for implementing QC as described above, the method 1200 also includes changing the phase setting of the processing layers based on the output signal from the plurality of processing layers so as to implement a quantum neural network (QNN). For example, a detection unit can be used to measure the output signal and send the measured information to a controller, which in turn changes the settings of the processing layers.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
a plurality of processing layers coupled in series, each processing layer in the plurality of processing layers including:
a Gaussian unit configured to perform a linear transformation on an input signal including a plurality of optical modes, the Gaussian unit including:
a network of interconnected beamsplitters and phase shifters, a first portion of the network of interconnected beamsplitters and phase shifters configured to form a first interferometer to apply a phase-sensitive Gaussian transformation on the plurality of optical modes and a second portion of the network of interconnected beamsplitters and phase shifters configured to form a second interferometer to apply a second phase-less transformation on the plurality of optical modes;
a plurality of squeezers operatively coupled to the network of interconnected beamsplitters and phase shifters and configured to apply squeezing along an arbitrary axis in a position-momentum plane to the plurality of optical modes; and
a plurality of displacers, operatively coupled to the plurality of squeezers and the network of interconnected beamsplitters and phase shifters, the plurality of displacers configured to apply a displacement in position and momentum to the plurality of optical modes, and
a plurality of nonlinear gates operatively coupled to the Gaussian unit and configured to apply an arbitrary nonlinear transformation on the plurality of optical modes; and
a controller operatively coupled to the plurality of processing layers and configured to control a setting of the plurality of processing layers based on an output signal from the plurality of processing layers, to vary the linear transformation and nonlinear transformations to switch the apparatus between a first mode to implement a classical neural network, a second mode to implement a quantum computation, and a third mode to implement a quantum neural network.

2. The apparatus of claim 1, wherein at least one of the Gaussian unit or the plurality of nonlinear gates is configured to create an entanglement or a superposition in the plurality of optical modes.

3. The apparatus of claim 1, further comprising:
a light source configured to send the plurality of optical modes, the light source and the plurality of processing layers being fabricated in a substrate.

4. The apparatus of claim 1, further comprising:
a feedback loop operatively coupled to an output interface of the plurality of processing layers, the feedback loop configured to send at least a portion of the output signal back from the plurality of processing layers to an input interface as a new input signal for the plurality of processing layers.

5. The apparatus of claim 1, wherein at least one nonlinear gate in the plurality of nonlinear gates includes a cubic phase gate or a Kerr gate.

6. The apparatus of claim 1, further comprising a detector operatively coupled to the plurality of processing layers and configured to measure a photon number of each optical mode in the output signal.

7. The apparatus of claim 1, wherein the controller is operatively coupled to: (i) each beamsplitter and phase shifter in the network of interconnected beamsplitters and phase shifters; (ii) each squeezer in the plurality of squeezers; and (iii) each nonlinear gate in the plurality of nonlinear gates.

8. A method, comprising:
propagating an input signal through a plurality of processing layers connected in series, the input signal including a plurality of optical modes, the propagation of the input signal through the plurality of processing layers includes:
performing a linear transformation on the plurality of optical modes using a Gaussian unit that includes (1) a network of interconnected beamsplitters and phase shifters, and (2) a plurality of squeezers operatively coupled to the network of interconnected beamsplitters and phase shifters, the linear transformation including:
applying a first phase-sensitive Gaussian transformation on the plurality of optical modes using a first portion of the network of interconnected beamsplitters and phase shifters that is configured to form a first interferometer;
applying squeezing along an arbitrary axis in a position-momentum plane to the plurality of optical modes using the plurality of squeezers;
applying a second phase-sensitive Gaussian transformation on the plurality of optical modes using a second portion of the network of interconnected beamsplitters and phase shifters that is configured to form a second interferometer; and
applying a displacement in position and momentum to the plurality of optical modes using a plurality of displacers; and
performing a nonlinear transformation on the plurality of optical modes using a plurality of nonlinear gates by applying an arbitrary nonlinear transformation to the plurality of optical modes using the plurality of nonlinear gates;
controlling a setting of the plurality of processing layers based on an output signal from the plurality of processing layers, to vary the linear transformation and nonlinear transformations to switch between a first mode to implement a classical neural network, a second mode to implement a quantum computation, and a third mode to implement a quantum neural network; and
sending the output signal from the plurality of processing layers based on the first mode, the second mode, or the third mode.

9. The method of claim 8, wherein at least one of the linear transformation on the plurality of optical modes or the nonlinear transformation on the plurality of optical modes includes creating an entanglement or a superposition in the plurality of optical modes.

10. The method of claim 8, further comprising:
sending the input signal to the plurality of processing layers using a light source, the light source and the plurality of processing layers being fabricated in a substrate.

11. The method of claim 8, further comprising:
sending at least a portion of the output signal from an output interface of the plurality of processing layers back to an input interface of the plurality of processing layers as a new input signal for the plurality of processing layers.

12. The method of claim 8, wherein at least one nonlinear gate in the plurality of nonlinear gates includes a cubic phase gate or a Kerr gate.

13. The method of claim 8, further comprising:
measuring a photon number of each optical mode from the plurality of optical modes in the output signal.

14. The method of claim 8, wherein the controlling the setting of the plurality of processing layers is performed using a controller, the controller being operatively coupled to: (i) each beamsplitter and phase shifter in the network of interconnected beamsplitters and phase shifters; (ii) each squeezer in the plurality of squeezers; and (iii) each nonlinear gate in the plurality of nonlinear gates.

15. A reconfigurable computing device, comprising:
a plurality of processing layers coupled in series and configured to receive an input signal including a plurality of optical modes, each processing layer in the plurality of processing layers including:
a Gaussian unit configured to perform a linear transformation on the plurality of optical modes, the Gaussian unit including:
a network of interconnected beam splitters and phase shifters;

a plurality of squeezers operatively coupled to the network of interconnected beamsplitters and phase shifters; and
a plurality of displacers operatively coupled to the plurality of squeezers and the network of interconnected beamsplitters and phase shifters; and
a plurality of nonlinear gates configured to perform a nonlinear transformation over the plurality of optical modes; and a controller operatively coupled to the plurality of processing layers and configured to switch the reconfigurable computing device between a first mode to implement a classical neural network, a second mode to implement a quantum computation, and a third mode to implement a quantum neural network, during the first mode:
a first portion of the network of interconnected beamsplitters and phase shifters being configured to form a first interferometer to apply a first phase-less transformation on the plurality of optical modes,
the plurality of squeezers being configured to apply a position-only squeezing to the plurality of optical modes,
a second portion of the network of interconnected beamsplitters and phase shifters being configured to form a second interferometer to apply a second phase-less transformation on the plurality of optical modes,
the plurality of displacers being configured to apply a position-only displacement to the plurality of optical modes, and
the plurality of nonlinear gates being configured to apply the nonlinear transformation between a first set of position eigenstates and a second set of position eigenstates of the plurality of optical modes, during the second mode:
at least one of the Gaussian unit or the plurality of nonlinear gates is configured to create an entanglement or a superposition in the plurality of optical modes, during the third mode:
at least one of the Gaussian unit or the plurality of nonlinear gates is configured to create the entanglement or the superposition in the plurality of optical modes, and
the controller is configured to change a setting of the plurality of processing layers based on an output signal from the plurality of processing layers.

\* \* \* \* \*